United States Patent
Tao

(10) Patent No.: US 9,589,125 B2
(45) Date of Patent: Mar. 7, 2017

(54) 3D PASS-GO

(71) Applicant: Hai Tao, Dublin, CA (US)

(72) Inventor: Hai Tao, Dublin, CA (US)

( * ) Notice: Subject to any disclaimer, the term of this patent is extended or adjusted under 35 U.S.C. 154(b) by 0 days.

(21) Appl. No.: 14/586,985

(22) Filed: Dec. 31, 2014

(65) Prior Publication Data

US 2016/0188865 A1    Jun. 30, 2016

(51) Int. Cl.
*G06F 21/36* (2013.01)
*G06F 3/0481* (2013.01)

(52) U.S. Cl.
CPC .......... *G06F 21/36* (2013.01); *G06F 3/04815* (2013.01)

(58) Field of Classification Search
CPC .............................. G06F 21/36; G06F 3/04815
See application file for complete search history.

(56) References Cited

U.S. PATENT DOCUMENTS

| | | | |
|---|---|---|---|
| 5,303,388 A * | 4/1994 | Kreitman | G06F 3/04815 715/836 |
| 5,559,961 A | 9/1996 | Blonder | |
| 5,608,387 A | 3/1997 | Davies | |
| 6,686,931 B1 | 2/2004 | Bodnar | |
| 7,844,825 B1 * | 11/2010 | Neginsky | G06F 21/83 713/184 |
| 2006/0010402 A1 * | 1/2006 | Undasan | G06F 3/0481 715/861 |
| 2006/0174339 A1 * | 8/2006 | Tao | G06F 21/36 726/18 |
| 2008/0235788 A1 * | 9/2008 | El Saddik | G06F 21/36 726/18 |
| 2010/0180336 A1 * | 7/2010 | Jones | H04L 9/3226 726/19 |
| 2010/0325721 A1 * | 12/2010 | Bandyopadhyay | G06F 21/316 726/19 |
| 2011/0072510 A1 * | 3/2011 | Cheswick | G06F 3/0481 726/18 |
| 2014/0354594 A1 * | 12/2014 | Kreutzer | G06F 3/044 345/174 |
| 2015/0121263 A1 * | 4/2015 | Yeh | G06F 3/04817 715/765 |
| 2015/0294103 A1 * | 10/2015 | Chou | G06F 21/34 726/19 |

OTHER PUBLICATIONS

Sehrawat, "3D Password-Secure Authentication," UG, 12 Department of Computer Science Engineering, Raj Kumar Goel institute of Technology for Women, Ghaziabad, Gautam Buddh Technical University, Lucknow, (India), International Journal of Advance Research in Science and Engineering, IJARSE, vol. No. 2, Issue No. 4, Apr. 2013, pp. 42-49.*

(Continued)

*Primary Examiner* — Jung Kim
*Assistant Examiner* — James J Wilcox

(57) ABSTRACT

A 3D graphical password authentication method displays a 3D grid upon a user's request to access a restricted resource. The 3D graphical password authentication method requires the user to enter his or her access password by touching one or more intersections, namely touching the corresponding sensitive areas, on the 3D grid with an input device. A password is then produced as a sequence of the coordinates of the intersections touched along with penup values.

18 Claims, 15 Drawing Sheets

(56) References Cited

OTHER PUBLICATIONS

Tao', "Pass-Go-A New Graphical Password Scheme," Jun. 2006, pp. 1-110.*
Tao et al ("Pass-Go, a New Graphical Password Scheme", University of Ottawa, Canada, Master Thesis, 2006, pp. 1-110).*
Alsulaiman-A Novel 3D Graphical Password Scheme Jul. 2006 pp. 125-128.*
Jermyn, "The Design and Analysis of Graphical Passwords" in Proceedings of the 8th USENIX Security Symposium, Aug. 1999, Washington, D.C.

* cited by examiner

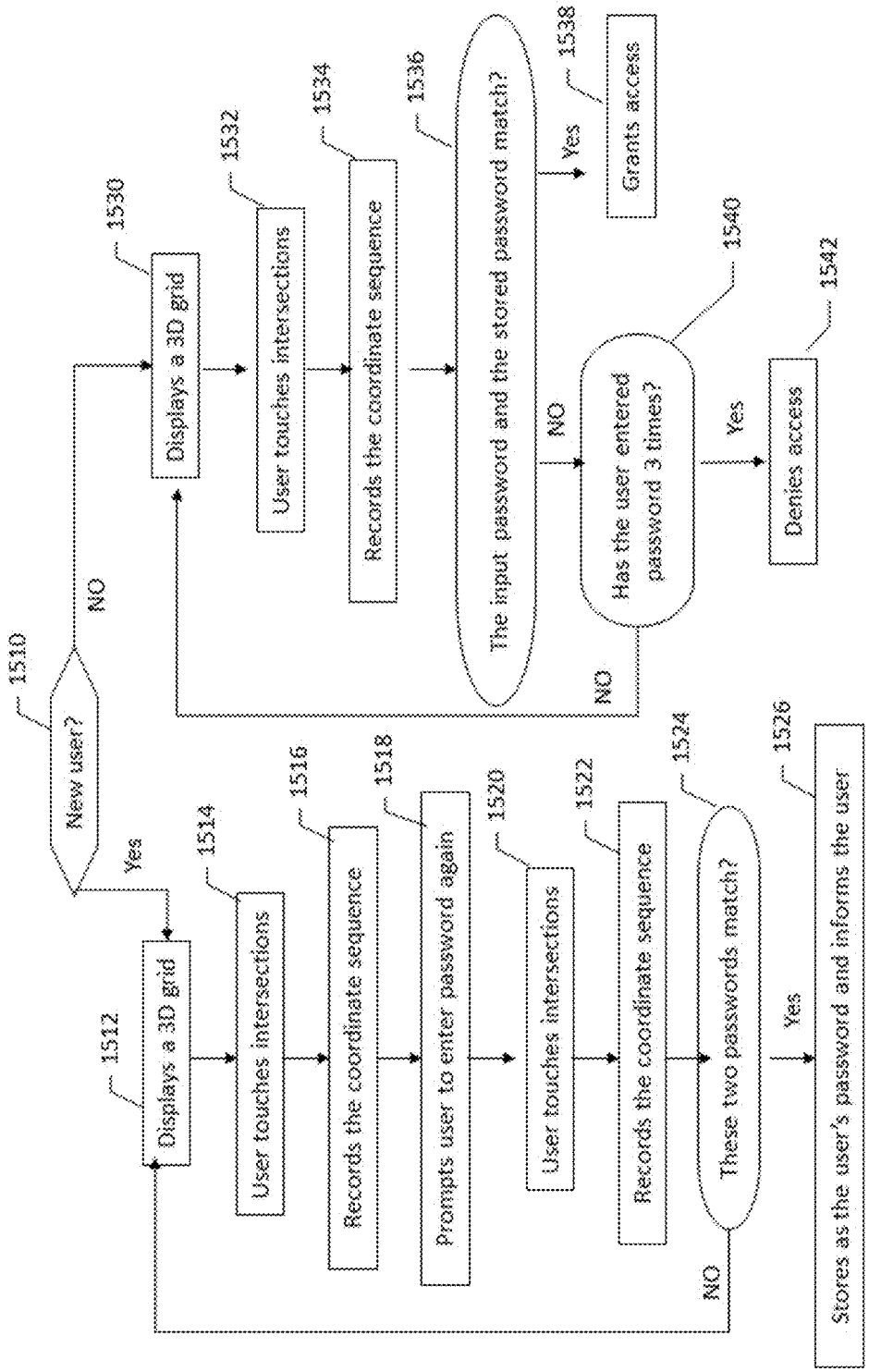

3D PASS-GO

FIELD OF THE INVENTION

This invention relates to 3D graphical password authentication schemes.

BACKGROUND OF THE INVENTION

Conventional textual password scheme uses a string of alphanumeric characters to identify a user. As people tend to choose inherently weak passwords, i.e. those passwords easy to remember, instead of strong passwords, textual password scheme is vulnerable to be attacked.

Graphical password schemes, which take advantage of a person's significant capability to recognize and to recall visual images, may resolve the problems associated with textual password schemes.

U.S. Pat. No. 5,559,961 to Blonder, issued Sep. 24, 1996, for example, discloses a graphical password scheme, in which a user is presented with a predetermined graphical image and is required to touch one or more predetermined positions ("tap regions") on the image in a predetermined sequence, as a means of entering a password. The drawback of such a scheme is that the memorable tap regions are usually limited and this leads to a limited effective password space.

Similarly, U.S. Pat. No. 5,608,387 to Davies, issued Mar. 4, 1997, teaches another graphical password scheme. Under this scheme, a user is required to touch one or more complex human face images as a password. This scheme also suffers from the relatively small password space. For instance, in the case of a 3×4 face matrix, if the length of the password is 6, the full password space amounts to $12^6 \approx 3$ millions.

U.S. Pat. No. 6,686,931 to Bodnar, issued Feb. 3, 2004, discloses a graphical password methodology for a microprocessor device that accepts non-alphanumeric user input. The graphical password comprises a sequence of non-alphabetic keystrokes, such as FORWARD, FORWARD, BACK, BACK, TOUCH. The full password space of this scheme is even smaller.

In 1999, Ian Jermyn proposed a graphical password scheme, "draw a secret", in which a user is required to draw a secret design on a grid. [In his paper entitled "The Design and Analysis of Graphical Passwords" in Proceedings of the 8th USENIX Security Symposium, August 1999] However, in this scheme, many passwords are difficult to remember and repeat, since "difficulties might arise however, when the user chooses a drawing that contains stokes that pass too close to a grid-line". The author gave a tentative solution: "the system does not accept a drawing which contains strokes that are located 'too close' to a grid line". However, it is very difficult to define how close is "too close" in this scheme. Users have to draw their input sufficiently away from the grid lines and intersections in order to enter the password correctly. If a user draws a password close to the grid lines or intersections, the scheme can not distinguish which cell the user is choosing. This limitation causes this scheme to require that the cells must be sufficiently large and must not be too small. This limitation also sacrifices the usability of inputting password, restricts freedom of choosing password (or shapes of drawings), and subsequently reduces the effective password space for this scheme.

In 2006, Hai Tao proposed an improvement of DAS, Pass-Go, in which a user selects (i.e. touches) the intersections of a grid as a way to input a password. [In his master thesis entitled "Pass-Go, a New Graphical Password Scheme", University of Ottawa, Canada] Pass-Go provides improvements on usability over DAS and provides significant large full password space: the full password space for Pass-Go 9×9 is $1.85 \times 10^{15}$ when the maximum password length is 8.

SUMMARY OF THE INVENTION

This invention, "3D Pass-Go", is directed to further increase the password space of Pass-Go and further improve the security of the prior art while keeping reasonable usability. In the present invention, a user seeking access to a restricted resource is presented with a 3D grid, and is required to touch one or more intersections, namely touching the corresponding sensitive areas, on the 3D grid as a way of indicating his or her authorization to access the restricted resource.

The invention increases the full password space and the security of Pass-Go. For example, in Pass-Go, on a 5×5 grid, if the password length (the number of the corresponding unique values associated with touched intersections) is 8, the full password space is $(5 \times 5)^8 = 1.52 \times 10^{11}$. On a 9×9 grid, if the password length is also 8, the full password space is $(9 \times 9)^8 = 1.85 \times 10^{15}$.

While in 3D Pass-Go, on a 5×5×5 3D grid, if the password length is 8, then full password space is $(5 \times 5 \times 5)^8 = 5.96 \times 10^{16}$. While in a 9×9×9 3D grid, if the password length is also 8, the full password space is $(9 \times 9 \times 9)^8 = 7.97 \times 10^{22}$.

In order to keep reasonable usability on large size 3D grids, following methods may be involved:

The 3D grid may be rotated or flipped to a different view angle. A user may then adjust and choose a view angle that he or she prefers to draw his or her password with more convenience.

The 3D grid may also be zoomed in and out to make it easier for a user to draw a password inside the 3D grid, especially on a large size 3D grid.

BRIEF DESCRIPTION OF THE DRAWINGS

The invention will now be described in more detail with reference to the accompanying drawings, in which:

FIG. 7 shows that the same 9×9×9 3D grid as in FIG. 6 is zoomed in;

FIG. 12 shows that the same 19×19×19 3D grid as in FIG. 11 is zoomed in;

FIG. 15 is a flow diagram illustrating how the invention can be used.

DETAILED DESCRIPTION OF THE INVENTION

Figure 1:
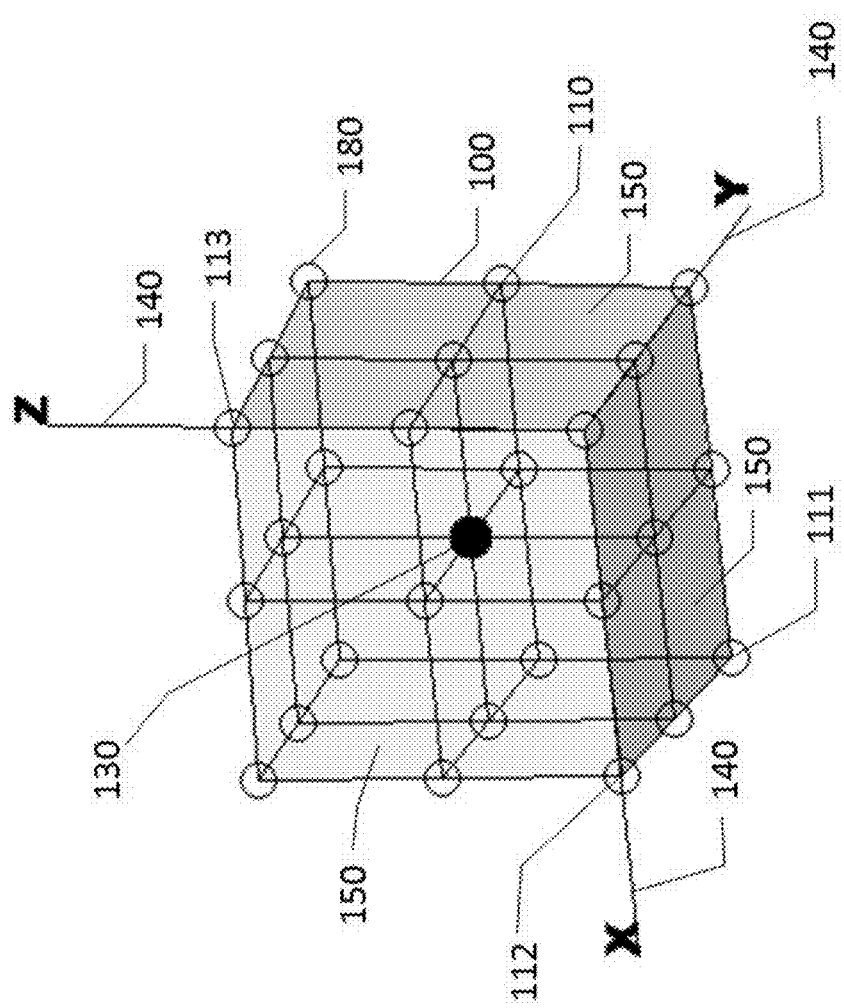
FIG. 1 shows a login interface, which displays a 3×3×3 3D grid along with reference dots, reference lines, reference cells, and sensitive areas.

Referring to the drawings, FIG. 1 shows a login interface, which displays a 3D grid 100. When a user requests to access a restricted resource, a 3D grid 100 is shown. The 3D grid 100 comprises of multiple horizontal lines (multiple lines in the direction of X-axis and multiple lines in the direction of Y-axis) and multiple vertical lines (in the direction of Z-axis). The 3D grid 100 login interface may be displayed on a touch screen of a smart phone or a tablet computer, a screen of a regular computer, a wearable computer such as a smart glasses, or any other display devices. The 3D grid 100 login interface may also be displayed in a real 3D space, with multiple horizontal lines and multiple vertical lines created by, for example, visible (or visible through a special glasses) laser lights or any other means.

The user is required to touch one or more intersections 110 on the 3D grid 100 as a means of entering his or her password with an input device. The input device could be a mouse, a stylus, a finger of the user, or any other input devices. When this invention is implemented in a real 3D space, a position sensor, a movement sensor, or any other sensors could be the input device.

Sensitive areas 180 may be displayed to help users locate and touch intersections 110 more conveniently. A sensitive area 180 is an area surrounding an intersection 110. The sensitive area 180 may have a specific size, shape, pattern, and color, which can be predefined. When this invention is implemented in a real 3D space, the sensitive area 180 may have the shape of a 3D round ball surrounding each intersection 110. Sensitive areas 180 may be transparent or hidden, namely they are not shown. In FIG. 1, sensitive areas 180 are illustrated as black circles as an example. Touching any point inside a sensitive area 180 is considered to be equal to touching the corresponding intersection 110.

Reference aids may also be displayed to assist users to observe the orientation of the 3D grid 100 and to memorize a password. Such reference aids may be dots, lines, or cells on the 3D grid 100. The number and position of reference aids can be predefined. The reference aids can have a specific shape, size, pattern and color. In FIG. 1, reference dots 130 are illustrated as solid black circles; reference lines 140 are illustrated as black lines extending the XYZ axes; reference cells 150 are illustrated as shaded cells.

Each intersection 110 on the 3D grid 100 has a unique value associated with it. The value may be denoted by a 3D coordinate (x, y, z) on the 3D grid 100. The numbering can start from 1 to n, from left to right along X-axis, from near to far along Y-axis, and from low to high along Z-axis. For example, in FIG. 1, the intersection 111 can be denoted as (1, 1, 1); the intersection 112 can be denoted as (1, 3, 1); the intersection 113 can be denoted as (3, 3, 3).

A "pen-up" event occurs whenever a user releases the input device (e.g., release the left button of a mouse or lift a stylus from a display surface). A specific value, or pen-up value, which may be expressed in the same manner as for the intersection but with a different value from ones for intersections, is used to denote the "pen-up" event, e.g., (0,0,0).

The password can then be denoted by a sequence of the 3D coordinates of the intersections touched along with "pen-up" values. Two passwords may be deemed to be identical if they can be denoted by the same sequence of the 3D coordinates and "pen-up" values.

A user may touch intersections 110 either intermittently or continuously. Touching intersections 110 intermittently means that a user touches only one intersection 110 before a "pen-up". Touching intersections 110 continuously means that a user touches two or more intersections 110 sequentially without a break before a "pen-up". Touching intersection continuously may go from one intersection to any other intersections 110 on the 3D grid 100.

Figure 3:
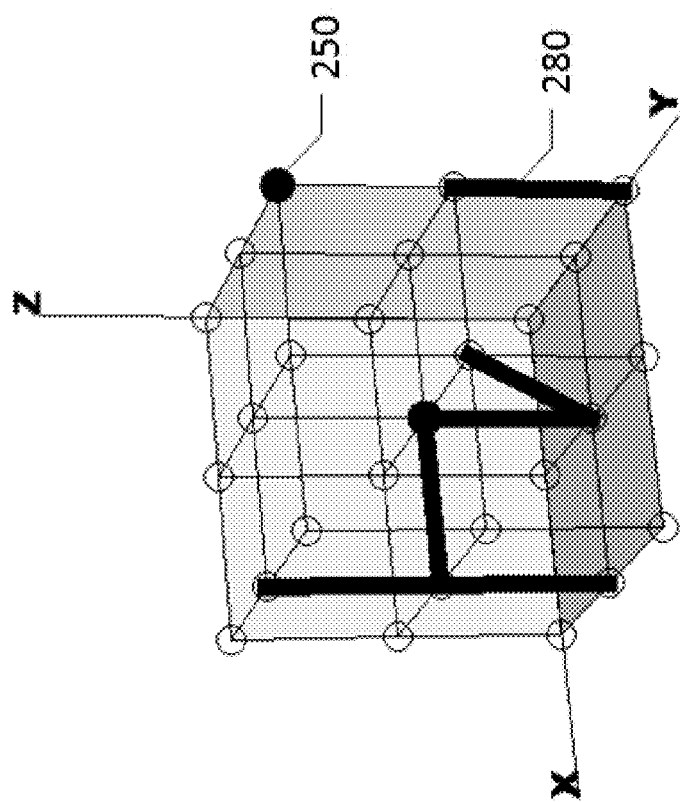
FIG. 3 shows dot and line indicators are displayed on the 3×3×3 3D grid when a user touches intersections to enter a password.

Means to indicate or notify the user acknowledging their input may be involved to assist users to enter a password. Such indicator means may be visual dots, lines or audible sound generated simultaneously in response to the user input. FIG. 3 shows how visual indicators are displayed when a user touches the intersections 110 as his or her password.

When a user touches intersections intermittently, a dot indicator 250 may appear on the touched intersection in response to each touch. Dot indicators 250 can have a specific shape, size, pattern and color. The shape, size, pattern and color of dot indicators 250 can be predetermined. In FIG. 3, dot indicators 250 are solid black circles.

Whenever two intersections are touched continuously, a line indicator 280 may appear from the first touched intersection to the second touched intersection. Line indicators 280 can have a specific shape, size, pattern and color. The shape, size, pattern and color of line indicators 280 can be predefined. In FIG. 3, line indicators 280 are black bolded lines.

Below an example is given to explain how a password as in FIG. 3 may be entered using a mouse.

First, the user presses down and hold the left button of the mouse inside the sensitive area 180 of the starting intersection (1, 2, 3), and drags through the sensitive area 180 of the intersection (1, 2, 2). As soon as the pointer of the mouse touches the sensitive area 180 of the intersection (1, 2, 2), a line indicator 280 appears from the intersection (1, 2, 3) to the intersection (1, 2, 2). The user keeps holding the left button and continues to drag to the sensitive area 180 of the intersection (1, 2, 1). As soon as the pointer touches the sensitive area 180 of the intersection (1, 2, 1), a line indicator 280 appears from the intersection (1, 2, 2) to the intersection (1, 2, 1). Then the user releases the left button of the mouse to finish this stroke.

Second, the user presses down and holds the left button of the mouse inside the sensitive area 180 of the next starting intersection (1, 2, 2), and drags through the sensitive areas 180 of the intersections (2, 2, 2), (2, 2, 1), and (2, 1, 2) continuously without a break. Line indicators 280 appear correspondingly to show the second stoke of the letter "h".

Third, the user presses down the left button of the mouse inside the sensitive area 140 of the intersection (3, 1, 3), and releases the left button before it touches any other sensitive areas 180. The dot indicator 250 appears when the user releases the left button of the mouse.

Finally, the user presses down and holds the left button of the mouse inside the sensitive area 180 of the next starting intersection (3, 1, 2), and drags through the sensitive area 180 of the intersection (3, 1, 1) continuously. The line indicator 280 appears from the intersection (3, 1, 2) to the intersection (3, 1, 1) accordingly to complete the last stroke.

In FIG. 3, the password can be, then, denoted by a sequence of 3D coordinates along with "pen-up" values as follows:

(1, 2, 3), (1, 2, 2), (1, 2, 1), (0, 0, 0), (1, 2, 2), (2, 2, 2), (2, 2, 1), (2, 1, 2), (0, 0, 0), (3, 1, 3), (0, 0, 0), (3, 1, 2), (3, 1, 1), (0, 0, 0)

Figure 2:
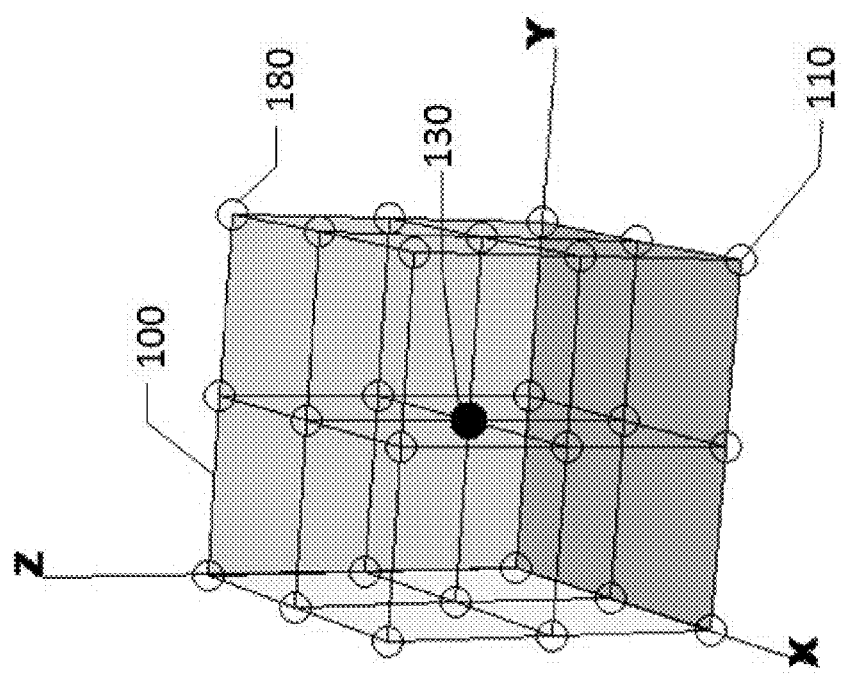
FIG. 2 shows the same 3×3×3 3D grid in FIG. 1 is rotated and flipped to another view angle.
Figure 4:
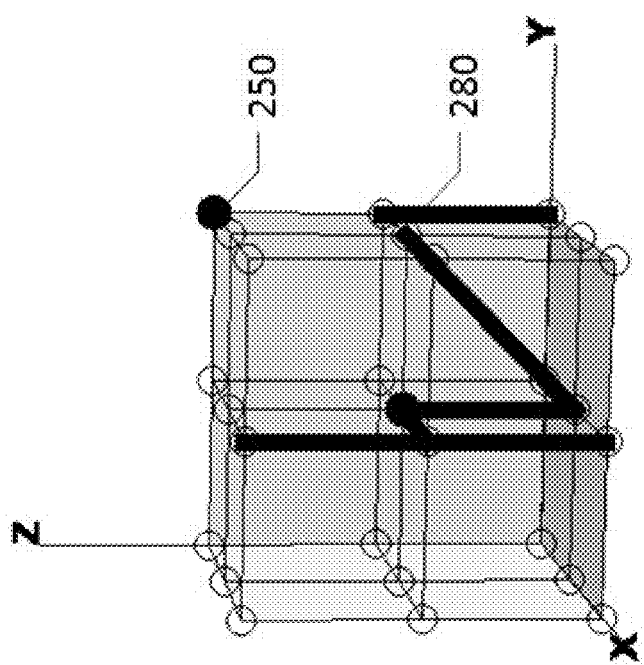
FIG. 4 shows the same password as in FIG. 3 when the 3×3×3 3D grid is rotated and flipped to a different view angle.
Figure 5:
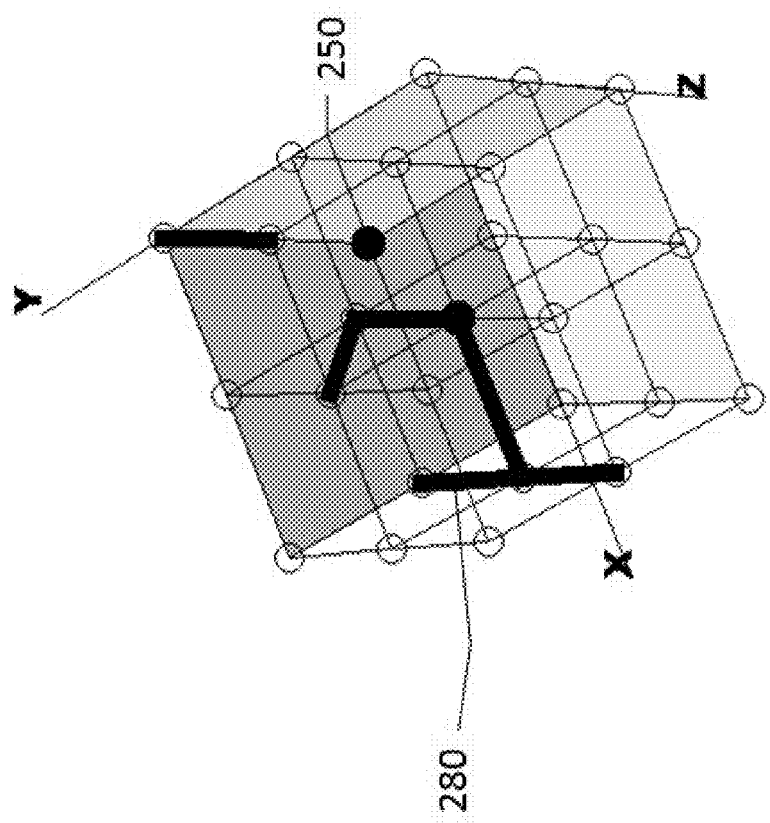
FIG. 5 shows the same password as in FIG. 3 when the 3×3×3 3D grid is further rotated and flipped to another different view angle.

To improve the usability, the 3D grid 100 may be rotated or flipped to different view angles so that a user can have more convenience to draw a password. Rotating or flipping a 3D object is a well-known prior art. FIG. 2 shows the same 3×3×3 3D grid 100 as in FIG. 1 is rotated and flipped to another view angle. FIG. 4 shows the same password as in FIG. 3 when the 3×3×3 3D grid 100 is rotated and flipped to a different view angle. FIG. 5 shows the same password as in FIG. 3 when the 3×3×3 3D grid 100 is further rotated and flipped to another different view angle.

If the input device is a mouse, the right button can be used to rotate or flip the 3D grid 100 while the left button is reserved for touching intersections 110. For example, the azimuth and elevation of the 3D grid 100 can be increased or decreased accordingly when the right button is pressed and dragged. The 3D grid 100 is then able to be rotated or flipped gradually from the user's point of view. The speed of the rotation and flipping may be fine-tuned to create the maximum user comfort. If the input device is a stylus or a finger, then an area, e.g. a surrounding area, can be defined as a rotating/flipping area. The azimuth and elevation of the 3D grid 100 can be increased or decreased accordingly when a stylus or a finger is touching and moving inside the rotating/flipping area. Alternatively, an additional key may be involved to differentiate if the user is trying to rotate/flip the 3D grid 100 or to draw a password.

The 3D grid 100 can also be zoomed in and out (e.g. with the scroll wheel of a mouse) to help users enter a password more conveniently, especially on a large size 3D grid 100. Zooming in and out a 3D object is a well-known prior art. For example, scrolling the wheel of a mouse forward can be treated as to zoom in, and scrolling the wheel backward is to zoom out. This allows large size of 3D grids 100, for example 9×9×9, 19×19×19 or even larger size of 3D grid 100, to be able to be deployed to create high level secure passwords while keeping reasonable usability.

Figure 6:
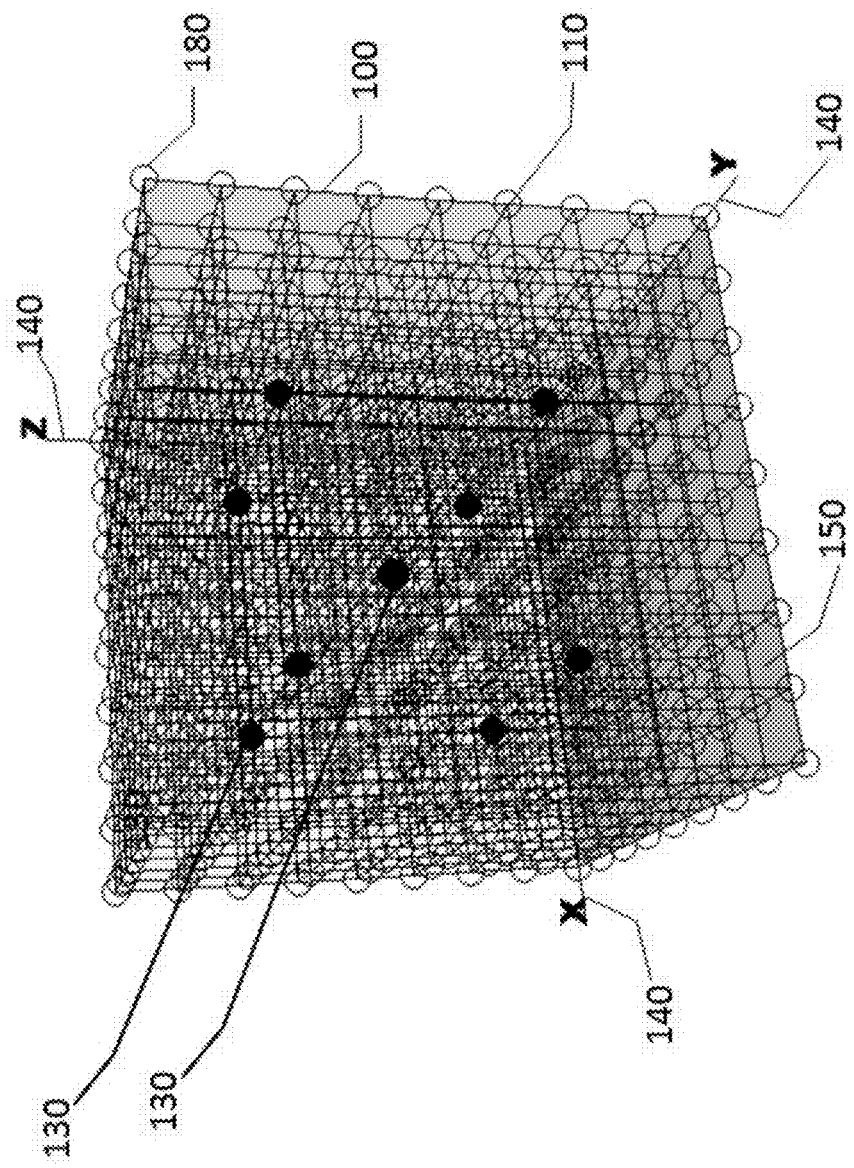
FIG. 6 shows a login interface, which displays a 9×9×9 3D grid along with reference dots, reference lines, reference cells, and sensitive areas.
Figure 7:
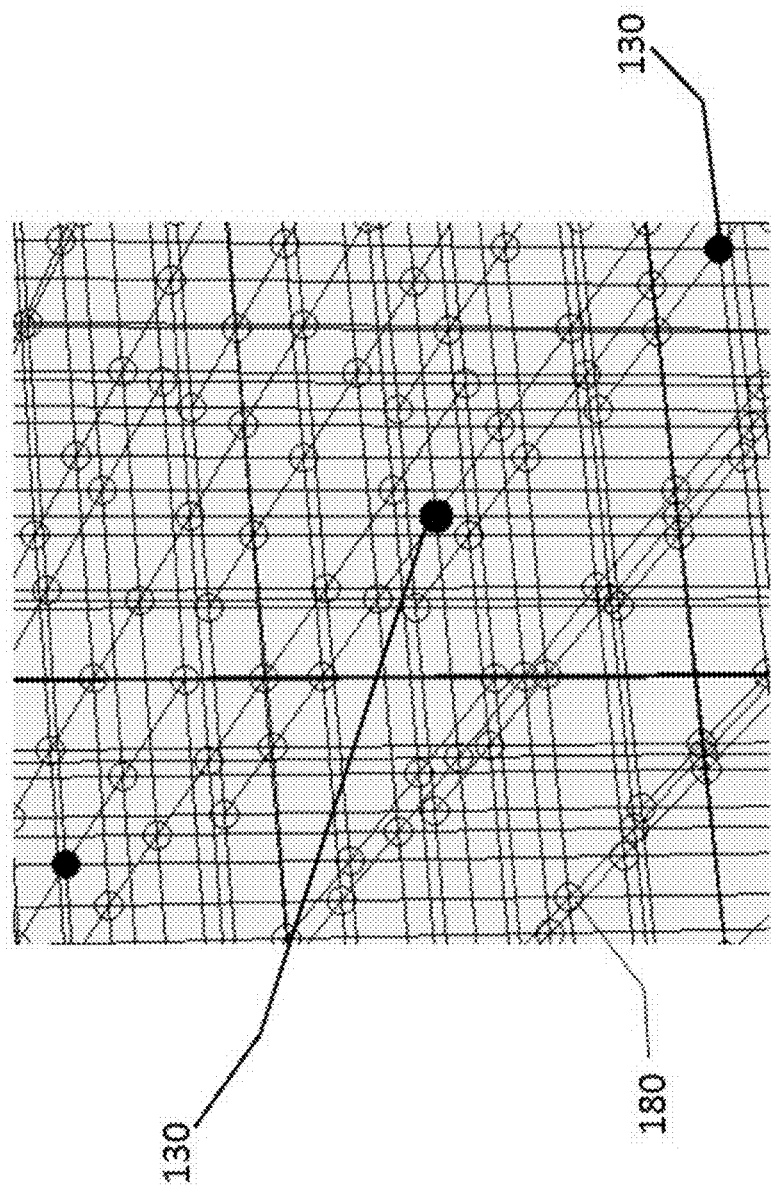
Figure 8:
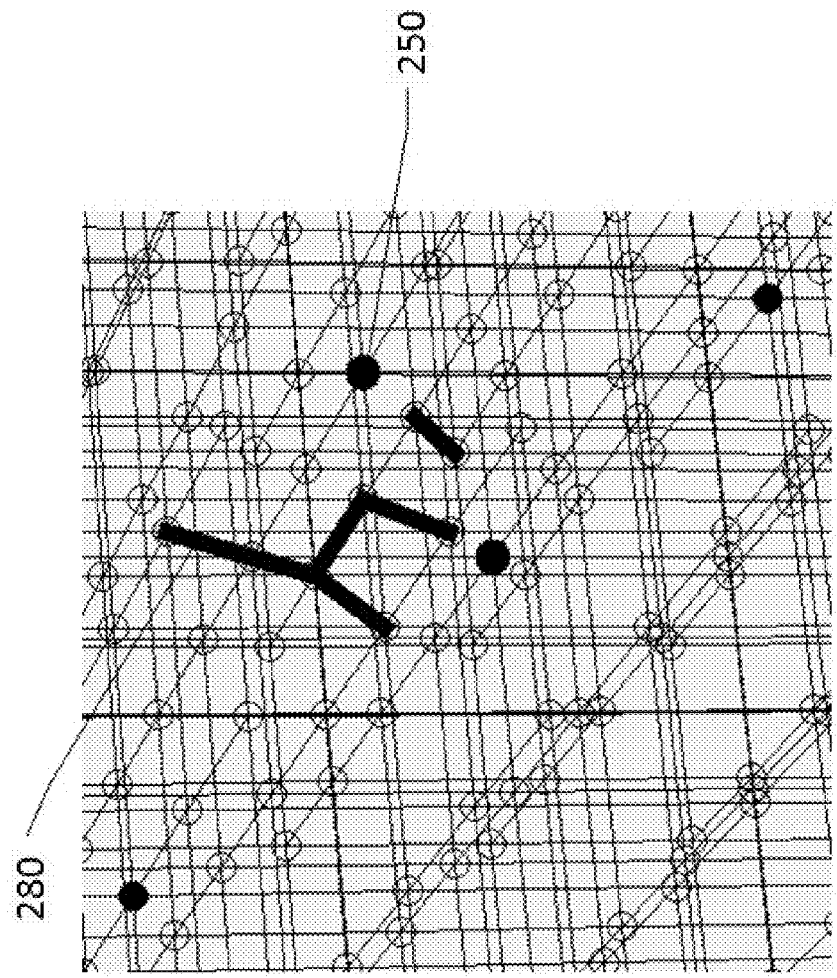
FIG. 8 shows that dot and line indicators are displayed on the "zoomed in" 9×9×9 3D grid as in FIG. 7 when a user touches intersections to enter a password.

In order to show that 3D Pass-Go could be implemented on large size 3D grids, examples are given below on 9×9×9 and 19×19×19 3D Pass-Go:

FIG. 6 shows a 9×9×9 3D Pass-Go. Reference dots 130, reference lines 140, and reference cells 150, and sensitive areas 180 are also displayed. The reference dots 130 are recommended to be in a color other than black, e.g. blue, to be seen more clearly. FIG. 7 shows the 3D grid 100 is then zoomed in so that only a part of the 3D grid 100 is seen. A user is then able to touch sensitive areas 180 more conveniently. FIG. 8 shows a password is entered with a shape of the word "hi". This password can be denoted as follows:

(4,7,2), (5,6,5), (6,5,8), (4,6,3), (0, 0, 0), (6,5,8), (6,5,7), (4,6,2), (0, 0, 0), (5,6,3), (0, 0, 0), (6,5,6), (7,4,9), (0, 0, 0)

Figure 9:
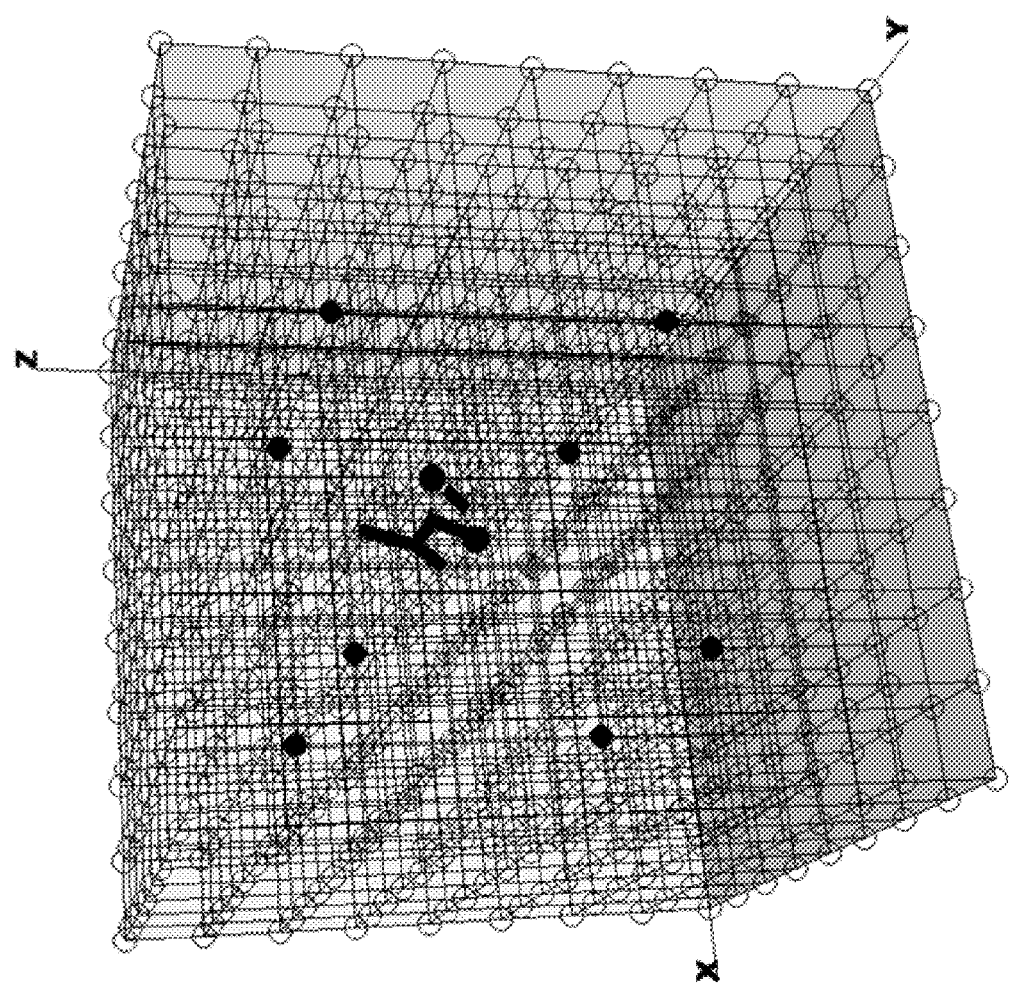
FIG. 9 shows the same password as entered in FIG. 8 when the 9×9×9 3D grid is zoomed out, rotated and flipped to a different view angle.
Figure 10:
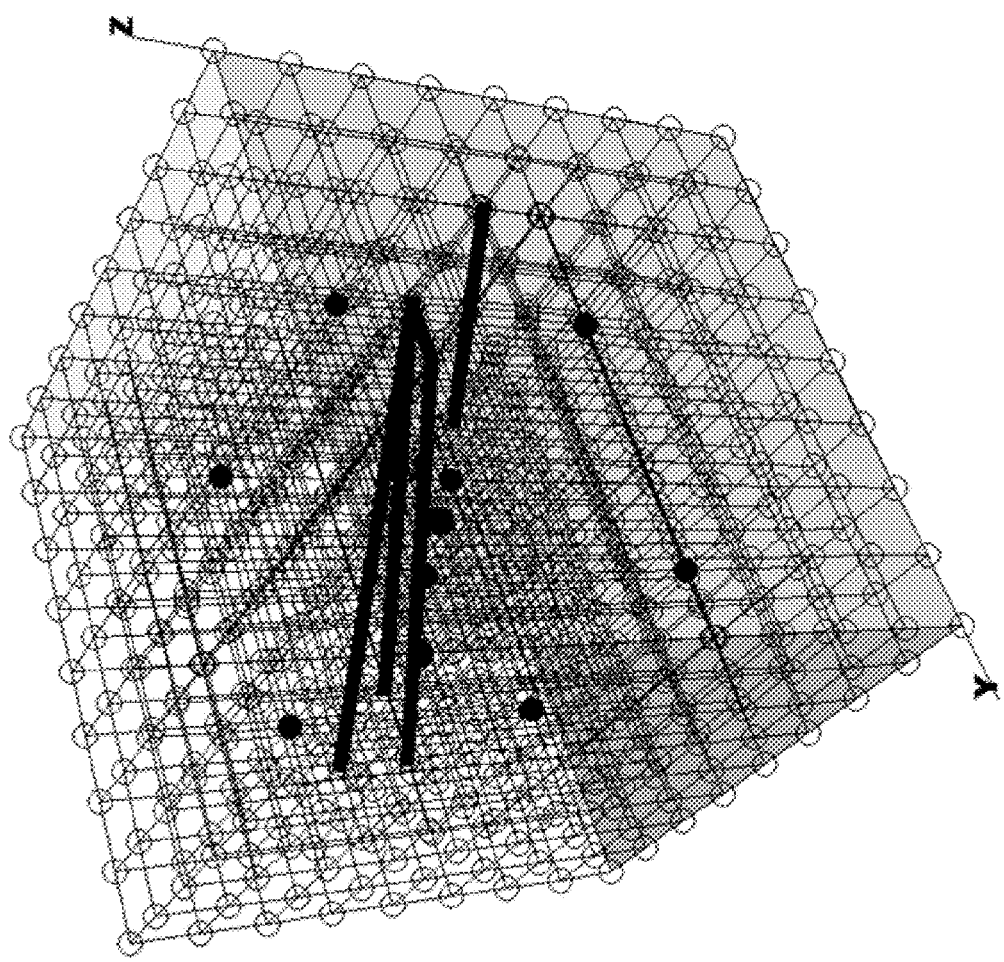
FIG. 10 shows the same password as entered in FIG. 8 when the 9×9×9 3D grid is zoomed out, and is further rotated and flipped to another different view angle.

FIG. 9 shows how the same password as in FIG. 8 looks when the 3D grid 100 is zoomed out. FIG. 10 shows how the same password as in FIG. 8 looks when the 3D grid 100 is further rotated and flipped to another view angle.

Figure 11:
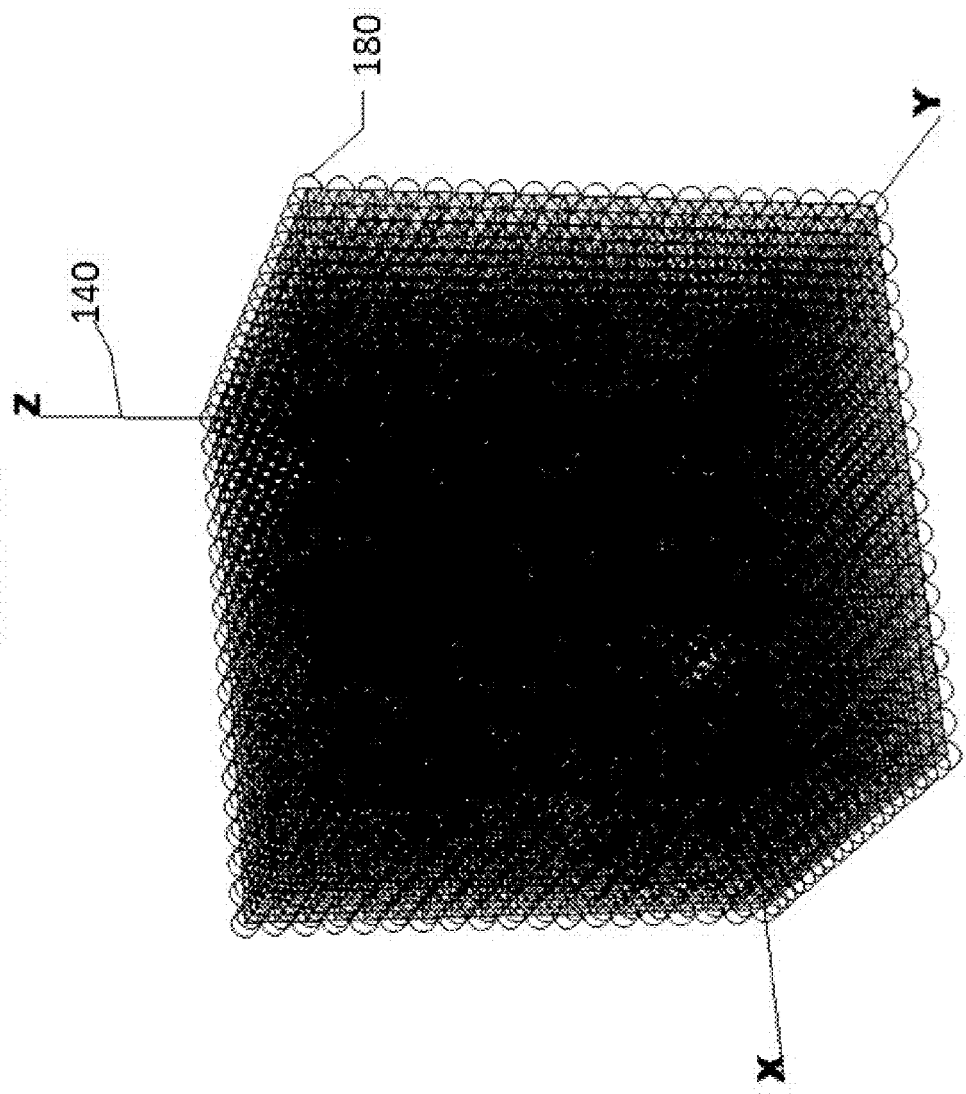
FIG. 11 shows a login interface, which displays a 19×19×19 3D grid along with reference dots, reference lines, reference cells, and sensitive areas.
Figure 12:
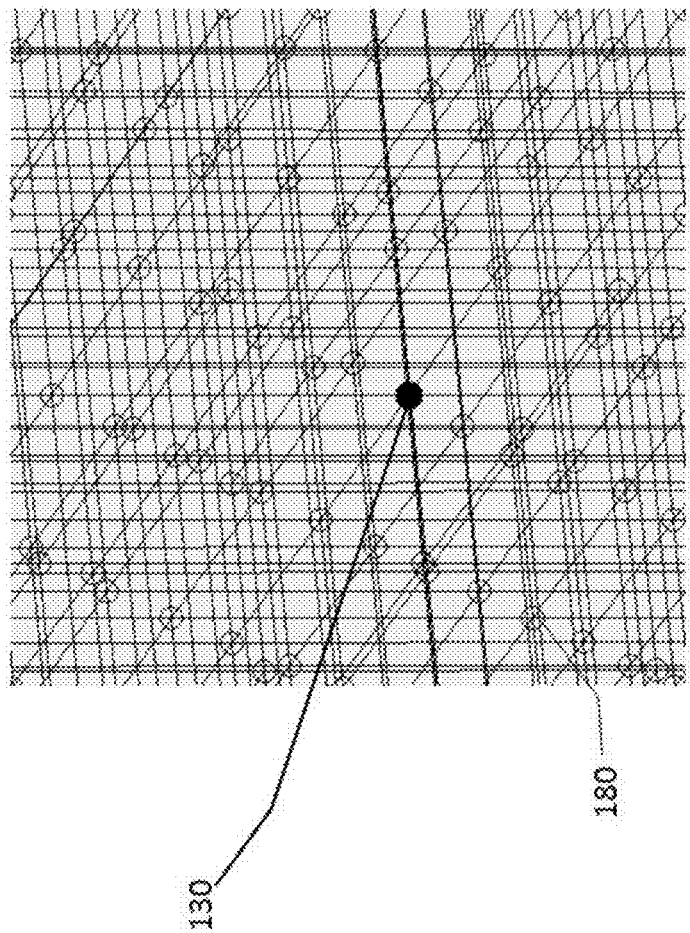
Figure 13:
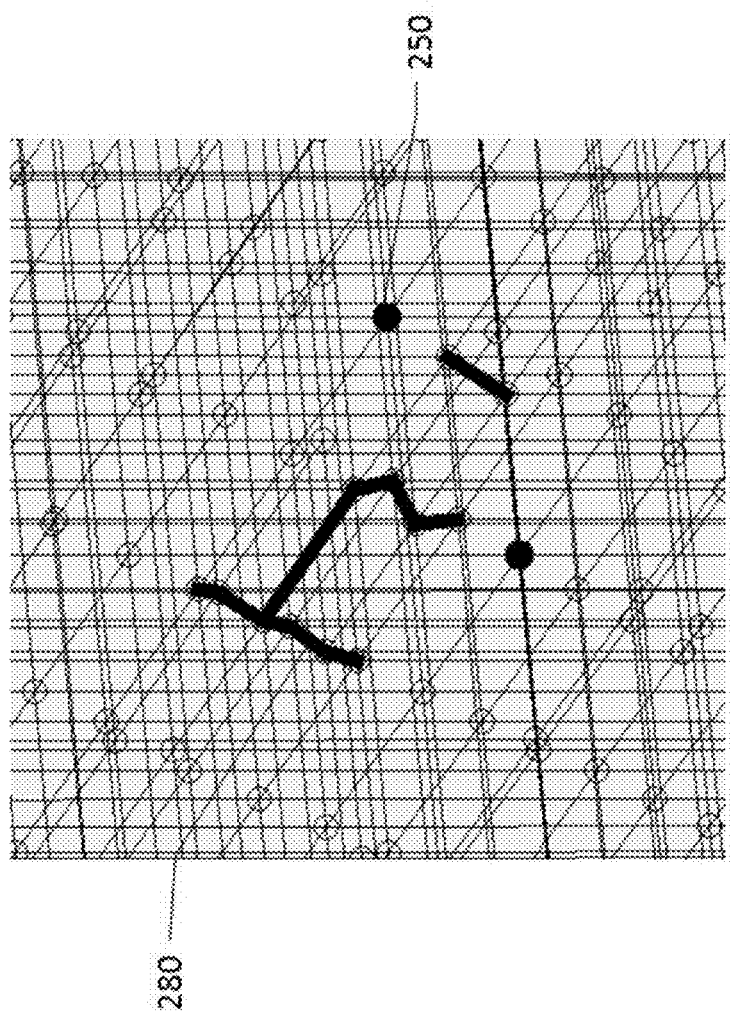
FIG. 13 shows that dot and line indicators are displayed on the "zoomed in" 19×19×19 3D grid as in FIG. 12 when a user touches intersections to enter a password.

FIG. 11 shows a 19×19×19 3D Pass-Go. Reference dots 130, reference lines 140, and reference cells 150, and sensitive areas 180 are also displayed. Reference aids might not be seen clearly here due to the size of the 3D grid 100. FIG. 12 shows that the 3D grid 100 is zoomed in so that only a part of the 3D grid 100 is seen, but more clearly. Sensitive areas 180 are then be able to be touched more conveniently. FIG. 13 shows a password is entered with a shape of the word "hi". This password can be denoted as follows:

(11,13,10) (7,2,13) (12,16,9) (8,5,12) (13,19,8) (9,8,11) (0, 0, 0) (12,16,9) (12,15,9) (8,4,12) (13,18,8) (9,7,11) (0, 0, 0) (11,11,10) (0, 0, 0) (12,14,9) (13,17,8) (0, 0, 0)

Figure 14:
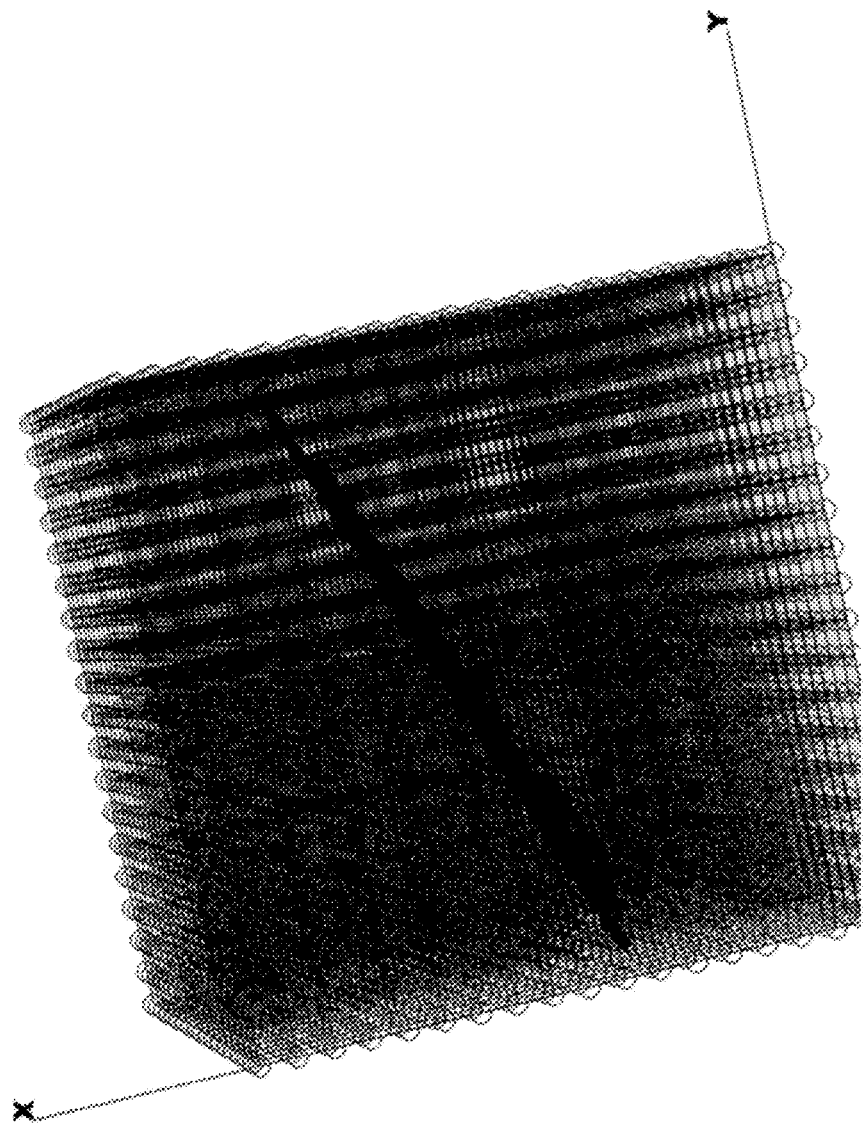
FIG. 14 shows the same password as entered in FIG. 13 when the 19×19×19 3D grid is zoomed out, rotated and flipped to a different view angle.

FIG. 14 shows the same password as in FIG. 13 when the 19×19×19 3D grid 100 is zoomed out, rotated and flipped to a different view angle.

An access password is a password, which a user enters to request access to a restricted resource. A file password is a password that stored in a storage means, which may be individually configured by the user or by a system administrator, or may be configured randomly by a processing means. File passwords can be encrypted by a processing means using an encryption algorithm, and the result of the encryption is stored in a storage means to improve the security of passwords. After the user enters his or her access password, processing means encrypts the access password and compares the result with the encrypted file password stored in the storage means, and decides whether the user is granted the access to a restricted resource.

FIG. 15 is a flow diagram to illustrate how the invention can be used as an example.

The steps for a user to create a new file password, for example, may be as follows:

A 3D grid 100, sensitive areas 180, and reference aids including reference dots 130, reference lines 140, and reference cells 150 are displayed, at step 1512. The user is, then, required to touch one or more intersections 110 on the 3D grid 100. After the user completes entering his or her file password by touching one or more intersections 110 on the 3D grid 100, at step 1514, the corresponding coordinate sequence is recorded, at step 1516, and the user is prompted to enter his or her file password again, at step 1518. After the user inputs his or her file password for the second time, at step 1520, the corresponding coordinate sequence is recorded, at step 1522. These two coordinate sequences are compared by a processing means, at step 1524. If they match, this coordinate sequence is stored in a storage means as the user's new file password, and the user is informed that the file password has been successfully created, at step 1526. If they do not match, the user is informed that these two file passwords do not match and the user is required to input his or her file password again from the beginning, until the user inputs two identical file passwords.

After a new file password is created, a user is required to enter his or her access password before he or she is given access to a restricted resource. When a user requests to access to the restricted resource, a 3D grid 100, sensitive areas 180, and reference aids including reference dots 130, reference lines 140, and reference cells 150 are displayed, and the user is required to touch one or more intersections 110 on the 3D grid 100 at step 1530. After the user completes entering his or her access password by touching one or more intersections 110 on the 3D grid 100, at step 1532, the corresponding coordinate sequence is recorded, at step 1534. The processing means compares this access password with the corresponding file password for the user stored in the storage means at step 1536. If they match, the user is granted to access to the restricted resource at step 1538; if they do not match and the user has entered an access password for three times, the user is denied access the restricted resource, at step 1542; if they do not match and the user has not entered the access password for three times, the user is informed that the access password he or she entered is incorrect, and is required to enter his or her access password again. The number of attempts that a user is allowed to enter wrong password consecutively can be predefined. In our example here, the times that a user is allowed to enter wrong password consecutively is three.

While the invention has been described with reference to preferred embodiments, it will be understood by those skilled in the art that various changes may be made and equivalent elements may be substituted for elements of the invention without departing from the scope of the present invention. In addition, modifications may be made to adapt a particular situation to the teachings of the present invention without departing from the essential scope thereof. Therefore, it is intended that the invention not be limited to the particular embodiment disclosed as the best mode contemplated for carrying out this invention, but that the invention include all embodiments falling within the scope of the appended claims.

What is claimed is:

1. A computer-implemented password authentication method comprising:
   a. displaying a three-dimensional (3D) grid with a plurality of horizontal lines in the directions of X-axis and Y-axis and a plurality of vertical lines in the direction of Z-axis on a touch screen of a mobile device upon a user's request to access a restricted resource;
   b. receiving a password entered by said user using an input device of the mobile device by touching a plurality of sensitive areas surrounding a first intersection inside said 3D grid and a second intersection on an exterior corner of said 3D grid of the horizontal lines and the vertical lines across different planes within said 3D grid, wherein the sensitive areas are visible to said user, and wherein the password is encoded as a sequence of 3D coordinates of said first and second intersections across the different planes within said 3D grid; and
   c. granting access to said user if the entered password matches a predetermined password.

2. The method as recited in claim 1, wherein said sensitive area surrounding said first intersection or said second intersection is a 3D space surrounding said first intersection or said second intersection.

3. The method as recited in claim 1, wherein said sensitive area surrounding said first intersection or said second intersection has a predetermined size, shape, pattern, and color.

4. The method as recited in claim 1, wherein said user touches one of said intersections by touching a point of corresponding said sensitive area by using said input device.

5. The method as recited in claim 1, wherein said sensitive area surrounding said first intersection or said second intersection is transparent or hidden.

6. The method as recited in claim 1, wherein said 3D grid includes predetermined number of reference aids, and said reference aids are placed at predetermined positions along said 3D grid.

7. The method as recited in claim 6, wherein said reference aid is comprising of a predetermined number of reference dots having predetermined shape, size, pattern and color, wherein said reference dots are placed at predetermined positions along said 3D grid.

8. The method as recited in claim 6, wherein said reference aid is comprising of a predetermined number of reference cells with predetermined shape, size, pattern and color, wherein said reference cells are placed at predetermined positions along said 3D grid.

9. The method as recited in claim 6, wherein said reference aid is comprising of a predetermined number of reference lines with predetermined shape, size, pattern and color, wherein said reference lines are placed at predetermined positions along said 3D grid.

10. The method as recited in claim 1, wherein each of said first and second intersections of said 3D grid corresponds with a unique value.

11. The method as recited in claim 10, wherein said unique value is a 3D coordinate on said 3D grid.

12. The method as recited in claim 11, wherein said password is a sequence of said 3D coordinates of one or more of said intersection(s) touched on said 3D grid along with pen-up values.

13. The method as recited in claim 1, wherein said 3D grid is zoomed in or out.

14. The method as recited in claim 1, wherein said 3D grid is rotated or flipped.

15. The method as recited in claim 1, wherein an indicator means is used to notify and acknowledge the users input.

16. The method as recited in claim 15, wherein said indicator means is a visual dot indicator appeared simultaneously on touched said first or second intersection as a response to user input, and said visual dot indicator has a predetermined size, shape, pattern and color.

17. The method as recited in claim 15, wherein said indicator means is a visual line indicator appeared simultaneously whenever two said intersections are continuously touched without a break, and said visual line indicator is drawn from a first touched intersection to a second touched intersection on said 3D grid as a response to user input, and said line indicator has a predetermined size, shape, pattern and color.

18. A non-transitory computer-readable medium comprising instructions that are executable by a processor to carry out a password authentication method, the password authentication method comprising:
   a. displaying a three-dimensional (3D) grid with a plurality of horizontal lines in the directions of X-axis and Y-axis and a plurality of vertical lines in the direction of Z-axis on a touch screen of a mobile device upon a user's request to access a restricted resource; and
   b. receiving a password entered by said user using an input device of the mobile device by touching a plurality of sensitive areas surrounding a first intersection inside said 3D grid and a second intersection on an exterior corner of said 3D grid of the horizontal lines and the vertical lines across different planes within said 3D grid, wherein the sensitive areas are visible to said user, and wherein the password is encoded as a sequence of 3D coordinates of said first and second intersections across the different planes within said 3D grid; and
   c. granting access to said user if the entered password matches a predetermined password.

\* \* \* \* \*